R. D. CRIPPEN.
SPRING SEAT.
APPLICATION FILED OCT. 1, 1914.
1,155,893.
Patented Oct. 5, 1915.
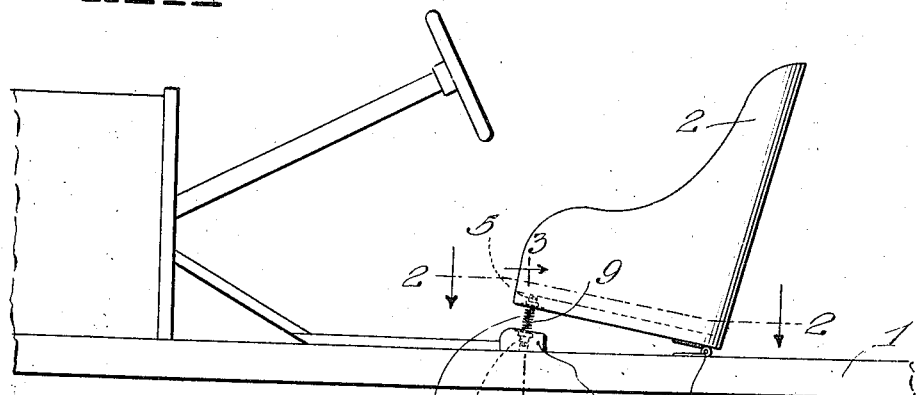
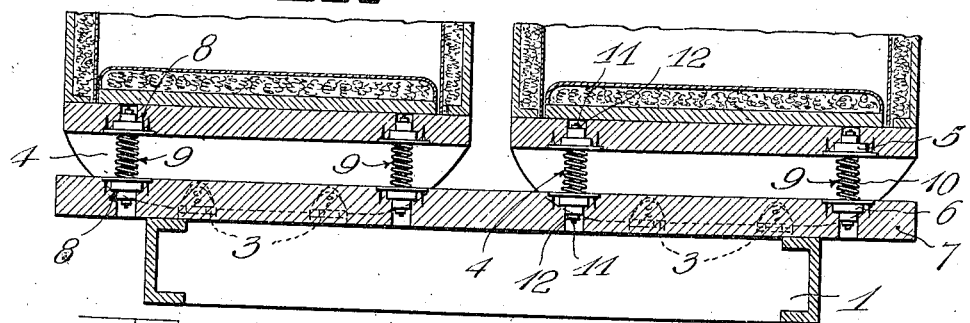
Witnesses
C. Uuuuker
Roland T. Booth
Inventor
Roy D. Crippen
By H. B. Willson & Co.
Attorney

UNITED STATES PATENT OFFICE.

ROY D. CRIPPEN, OF SAN DIEGO, CALIFORNIA.

SPRING-SEAT.

1,155,893.

Specification of Letters Patent.

Patented Oct. 5, 1915.

Application filed October 1, 1914. Serial No. 864,509.

*To all whom it may concern:*

Be it known that I, ROY D. CRIPPEN, a citizen of the United States, residing at San Diego, in the county of San Diego and State of California, have invented certain new and useful Improvements in Spring-Seats; and I do declare the following to be a full, clear, and exact description of the invention, such as will enable others skilled in the art to which it appertains to make and use the same.

This invention relates to new and useful improvements in spring seats for application to use in connection with vehicles and other structures, more particularly for automobiles, and the primary object of the invention is to provide a spring supported seat which will yield readily to the jars and jolts incident to the ordinary travel of the vehicle.

A further object of the invention resides in providing a seat which is hinged at its one end to the frame of the vehicle and swung upwardly toward its opposite end, said last mentioned end being spring supported.

Still another object of the invention resides in providing an improved spring supported seat which is simple and durable in construction, inexpensive to manufacture and one which will be very efficient and useful in operation.

With these and other objects in view my invention consists of the novel features of construction, combination and arrangement of parts as will be hereinafter referred to and more particularly pointed out in the specification and claim.

In the accompanying drawing forming a part of this application:—Figure 1 is a side elevation of a device constructed in accordance with my invention and applied to use on an automobile: Fig. 2 is a horizontal section as seen on line 2—2 of Fig. 1; Fig. 3 is an enlarged vertical section through the device as seen on line 3—3 of Fig. 1; and, Fig. 4 is an enlarged detail section of one of the yielding members used on the device.

In describing the invention I shall refer to the drawings in which similar reference characters designate corresponding parts throughout the several views and in which—

1 indicates the frame of a vehicle such as an automobile upon which is adapted to be mounted the seats 2. In mounting these seats on the frame I provide my improved spring supporting mechanism which will be hereinafter and more particularly set forth.

It will be understood that it is desirable in mounting seats on automobile frames to position the same so that they are inclined upwardly toward their forward ends, thus making the same particularly comfortable in use. In carrying out this idea, I provide a pair of strap hinges 3 the same being properly secured to the under face of the seat at its rear end and to the frame or sub-frame of the vehicle. This will admit of the rocking of the seat with respect to the frame and I desire to provide a yielding connection between the forward end of the seat, and said frame and in carrying out this idea a pair of yielding members 4 are provided in connection with each seat which yielding members will be described in detail here below.

Each yielding member comprises an upper and lower cap member 5 and 6 respectively, the former being countersunk in the under face of the seat bottom and the latter similarly mounted in a transverse bar 7 on the frame or sub-frame of the vehicle. These cap members are each offset intermediate of their ends to provide a shoulder or the like 8 and arranged between the cap members to rest on the shoulders thereof is is a strong expanding coil spring 9. Arranged within this coil spring 9 is an additional and inner coil spring 10 which may be termed a contracting inner spring the end coils of which are engaged with the heads of bolts or screws 11. The shanks of these screws or bolts extend through the ends of the cap members and are engaged with nuts 12. The connection between the forward end of the seat bottom and the frame is apparent from this construction and it will be seen that through the medium of the screws and nuts 11 and 12 the tension of the inner contracting spring may be readily adjusted. It will further be seen that a rocking action may be readily had through the combined hinge and spring connection between the seat and the frame so that as obstructions are met in the path of travel the jolting and jarring incident thereto will be compensated for. Such a device as this is particularly desirable where springs are stiff and no shock absorbers are used, but it will be understood that the same is well adapted for use on all vehicles regardless of the spring suspension therefor.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, within the scope of the appended claim, without departing from the spirit or sacrificing any of the principles of the invention.

Having thus described my invention, what I claim is:

In a spring seat for vehicles, a frame, a seat hinged at its rear edge thereon and inclined upwardly toward its forward edge, said seat having a pair of substantially vertical openings formed therethrough at its forward edge, a transverse bar mounted on said frame beneath the forward edge of said seat, said bar having formed therethrough a pair of openings alined with the openings through said seat edge, a cap member positioned in each of said openings at its inner end, said members being offset intermediate their ends to provide shoulders, expanding springs between each pair of cap members arranged therein against said shoulders, a contracting spring within the expanding spring, a bolt extending through the end of each cap member and having its head engaging the adjacent end of the contracting spring, and a nut on the outer end of each bolt, whereby the tension of the springs may be varied.

In testimony whereof I have hereunto set my hand in presence of two subscribing witnesses.

ROY D. CRIPPEN.

Witnesses:
 H. B. HAKES,
 BRYANT B. HAKES.